Feb. 22, 1966 R. C. BLAIR 3,236,509
PROCESS AND APPARATUS FOR CONTINUOUS
CALCINING OF POWDERED GYPSUM ROCK
Filed Sept. 17, 1962 2 Sheets-Sheet 1

INVENTOR:
Robert C. Blair
By
Fetherstonhaugh & Kent
his Atty.

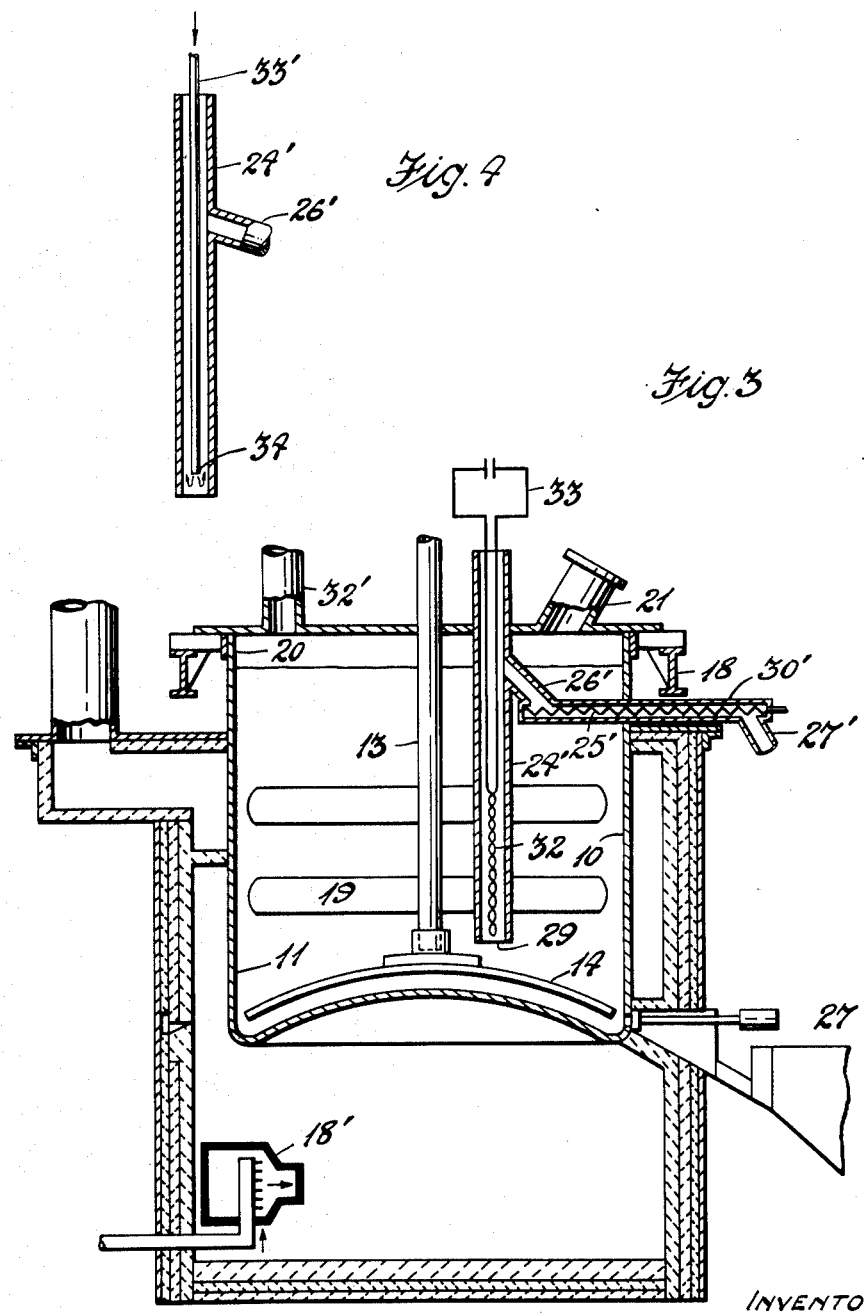

United States Patent Office 3,236,509
Patented Feb. 22, 1966

3,236,509
PROCESS AND APPARATUS FOR CONTINUOUS CALCINING OF POWDERED GYPSUM ROCK
Robert C. Blair, Winnipeg, Manitoba, Canada, assignor to The British Plaster Board (Holdings) Limited, London, England
Filed Sept. 17, 1962, Ser. No. 224,195
33 Claims. (Cl. 263—21)

My invention relates to new and useful improvements in the process and apparatus for continuously calcining powdered gypsum rock this specification constituting a continuation-in-part of my U.S. application, Serial No. 152,968, filed November 13, 1961, now abandoned.

The continuous calcination of gypsum has been accomplished in the past by continuously feeding gypsum rock broken to a size of about ¼ inch screen into a rotary kiln heated by a flame or combustion gases passing through or outside the kiln. A process has also been tried in which hot products of combustion are passed through a thin moving bed of powdered gypsum, a continuous feed of raw gypsum and a continuous discharge of calcined gypsum being maintained. This process is known as the fluidized bed process.

A process has also been proposed by U.S. Patent 2,934,328 in which gypsum dihydrate is pumped into the bottom of a closed kettle and discharged continuously from the top. The pump consists of a screw conveyor delivering dihydrate from the bottom of bins into the bottom of the kettle, the pitch of the screw being reduced near the discharge point to pack the powdered dihydrate therein and form a seal to prevent the escape of steam and hot plaster through the conveyor. The products of combustion of the fuel used to heat the exterior of the kettle and tubes passing through it are passed over the top of the plaster in the kettle and pass out of the kettle through the discharge pipe for the calcined plaster.

A still further process has been proposed by U.S. Patent 1,746,294, in which powdered gypsum dihydrate is pumped into the bottom of a closed, sealed kettle by means of a screw conveyor situated at the top of the kettle and delivering into a pipe passing from the top of the kettle to a point near the bottom. Dihydrate is continuously fed into the bottom of this closed kettle and overflows through a pipe into a discharge pump of the screw conveyor type with a reduced screw pitch near the discharge end designed to pack the calcined plaster and so seal the system. The discharge pump delivers into an L-shaped steam jacketed pipe and it is stated that calcination is completed in this pipe.

The arrangement is such that the preliminary partial calcination of the dihydrate in the sealed kettle takes place in an atmosphere of saturated steam. The steam so generated is introduced into the L-shaped pipe to fluidize the plaster therein so that the final calcination is also carried out in an atmosphere of steam. The steam generated in the closed kettle may also be passed into the steam jacket of the L-shaped pipe to provide additional heat for the final calcination of the plaster.

If gypsum is calcined in a saturated steam atmosphere, a large proportion of alpha hemihydrate will be produced. Such plaster has a low water carrying capacity and while it is suitable for some purposes, it is not desirable for others. Tyler's proposed process would produce such a plaster.

The dihydrate of calcium sulphate, that is, gypsum has a specific gravity of 2.32 while the hemihydrate has a specific gravity of 2.75.

Both Tyler and Zvejniek's propose to introduce dihydrate into the bottom of a kettle in which partly calcined or calcined hemihydrate exists in a fluidized state and to continuously discharge material from the top surface of the fluidized material in the kettle. Because of the lesser density of the dihydrate it will tend to rise rapidly to the surface of the heavier hemihydrate in the kettle where it will be withdrawn by the discharge means. Such a discharged material would have an excessive proportion of dihydrate in it and would be useless as a plastering material. In the case of Tyler, he reduces this excessive amount of dihydrate in a second calcining operation while Zvejniek completes the calcination by mixing the flue gasses with the material in the discharge pipe and in a cyclone after the material has left the kettle.

Both Zvejniek and Tyler must use pumps to force the raw gypsum powder into the kettle against the head of plaster in the kettle. Such power pumps are undesirable as they have a tendency to block up.

The principal object of my invention is to provide a means of continuously calcining gypsum in which raw gypsum is added to the top of a fluidized mass of calcined gypsum continuously while a corresponding amount of material is continuously removed from the bottom of the mass.

A further object of my invention is to provide a means of continuously calcining gypsum in which raw gypsum is fed onto the top of a mass of fluidized calcined gypsum and calcined gypsum is discharged continuously from the bottom of the mass through a stand pipe connected thereto and having an outlet situated just below the top of the mass, such discharge being brought about by the differential head existing between the top of the fluidized mass and the outlet flue stand pipe.

I have found that a commercially satisfactory calcined gypsum can be produced in this manner provided the temperature of the mass of calcined gypsum is maintained within prescribed limits which are referred to more particularly hereinafter.

I have found that, providing heat is supplied to the mass at a rate which corresponds to the heat required to calcine the raw gypsum added, the material flowing off from the mass will be satisfactorily calcined and that the temperature of the mass will remain substantially constant.

The mass of calcined gypsum has the effect of absorbing fluctuations in (a) the rate of heating and in (b) the rate of feed of raw gypsum, by providing respectively a reservoir of heat and a dispersal volume for the raw gypsum added so that it is calcined before it leaves the mass. In other words as to (b), the mass of gypsum at calcining temperature also provides a large contact area through which the raw gypsum is heated and the calcining process takes place quickly as a result.

In one form of my invention I provide a rising conduit or stand pipe about 8 inches in diameter from the side of a gypsum calcining kettle near the bottom and operatively extending upward to the normal level of plaster in the kettle. Plaster kettles are well known and commonly used in the art of calcining plaster and one is shown as modified in accordance with my invention in the drawings, but is not particularly described since its construction is well known.

By means of my invention it is possible to produe hemihydrate (sometimes known as "first-boil" plaster) or in another form of my invention to produce hemihydrate or soluble anhydrite, sometimes known as "second-boil" plaster.

I have found that the output of a conventional kettle, as modified by my invention and operated continuously, can be considerably increased without damage to the furnace or other parts of the kettle and that there is a considerable saving in fuel for any given plaster production.

My invention also makes easier the control of the process by automatic means. Thus having decided the desirable temperature of the mass the rate of feed can be easily controlled to maintain the temperature with a constant rate of heating by conventional controls. Alternately the rate of heating can be varied with a constant rate of feed of raw gypsum to maintain this desirable temperature. Such a control easily maintains a constant set of conditions of calcination leading to a uniformly calcined product.

In a second form of my invention I provide a continuous feed into a mass of fluidized gypsum in a container and a continuous discharge through a stand pipe or rising conduit arranged to discharge the overflow at the normal level of the material in the container and I introduce hot gases into the bottom of the mass of fluidized gypsum to provide the necessary heat for calcination and to assist in the fluidization of the mass.

In the process of calcining powdered gypsum to hemihydrate approximately 15% of the weight of gypsum is driven off in the form of steam and in a mass of the material this has the effect of fluidizing the mass and the mass appears to boil and in this state has the flow properties of a fluid.

When the process of calcination to hemihydrate is complete the boiling almost ceases and if heating is continued the temperature of the mass increases. Continued heating will cause the mass of hemihydrate to begin to boil a second time at some more elevated temperature (dependent upon the ambient humidity conditions and various impurities in the gypsum) and this process will continue, there being a hiatus in the rate of temperature increase. Continued heating again results in a sharp rise in temperature indicating that the remaining 5% of water of crystallization has been substantially removed. The mass then consists almost entirely of soluble anhydrite or "second-boil" plaster.

Although this invention is described in relation to the calcination of gypsum, it should be understood that particularly the second form of my invention is applicable to the calcination or heat treatment of other powdered materials such as, for instance, limestone.

In the first form of my invention the mass of plaster is brought to the state of calcination to hemihydrate by externally heating the kettle until the "boil" settles down. In the conventional process the mass would be dumped by opening a valve in the side of the kettle adjacent to the bottom. The mass although boiling less vigorously is still in a fluid condition and readily flows out of the kettle. According to my invention instead of dumping the kettle at the completion of calcination to hemihydrate, additional raw ground gypsum is added continuously to the top of the mass in measured quantity and the introduction of this raw material immediately causes the mass to boil vigorously due to the sudden release of steam on contact with the hemihydrate in the mass which is at a temperature in excess of the normal boiling temperature for the ambient conditions existing in the mass.

Owing to the intimate contact between the "superheated" hemihydrate and the raw gypsum, calcination takes place very rapidly and provided the temperature is maintained sufficiently above the normal "boiling" temperature of the gypsum the overflow from the stand pipe will consist of commercially satisfactorily calcined hemidrate.

I have found that commercially satisfactory hemihydrate can be produced by maintaining the mass of plaster between a temperature range of 280° F. to 340° F. in a common type of kettle 10 feet in diameter and 10 feet deep. At temperatures below 280° F. there is a tendency to produce a plaster with an excess of gypsum while at temperatures above 340° F. the mass begins to loose some of its fluid properties and a larger head above the stand pipe is necessary to maintain flow.

In the second form of my invention I prefer to introduce the products of combustion of a gas fuel (although the products of combustion of any clean burning fuel can be used) into the mass of calcined gypsum at the bottom of the kettle, at a pressure slightly above the pressure of that exerted by the fluidized mass at the depth of introduction of the hot gases.

In this second form the introduction of the hot gases assists the released steam in maintaining fluidization of the mass and it is possible to maintain the fluidized state of the mass through the hemihydrate state to the soluble anhydrite stage of calcination. In the second form of my invention, the lower limit of temperature is reduced to 220° F. due to the reduced partial pressure of the water vapour in the ambient atmosphere.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 3 represents a section of a conventional plaster kettle showing the preferred embodiment of my invention.

FIGURE 4 is a fragmentary elevation of an alternative fluidization method.

In the drawings like characters of reference indicate corresponding parts in the different figures.

Figure 1:
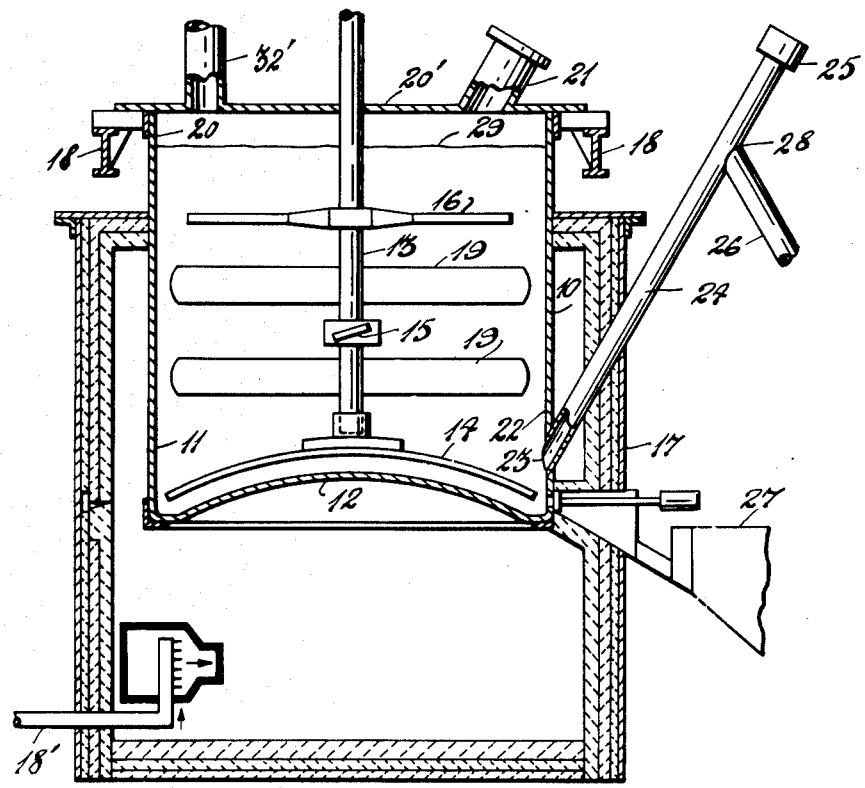
FIGURE 1 represents a section of a conventional plaster kettle modified in accordance with the first form of my invention.

Proceeding therefore to describe the first embodiment of my invention in detail, reference character 10 illustrates a cylindrical calcining kettle including side walls 11, convex base 12, centrally located agitator shaft 13, and agitator blades 14, 15 and 16 situated upon the shaft 13. It will be appreciated of course, that this shaft can be rotated by a source of power (not illustrated).

The kettle 10 is suspended within a combustion chamber 17 by means of two transverse members 18 extending above the combustion chamber and the combustion chamber is adapted to supply heat from a source of heat 18' in a conventional manner to the calcining kettle, cross flues 19 extending through the kettle 10, to transfer heat from the combustion chamber to the gypsum rock within the kettle.

The upper end 20 of the kettle is closed by the top plate 20' and is provided with a variable feed inlet 21 connected to a mineral feed bin (not illustrated). A vent 32' is connected to the top of the kettle to release steam to atmosphere through a dust extractor (not shown).

Adjacent the bottom 22 of the kettle, I have provided an outlet 23 to which is connected an upwardly and outwardly inclined stand pipe or rising conduit 24 the upper end 25 of which extends above the top plate 20' of the kettle.

However, extending from and communicating with the stand pipe 24, is a downwardly and outwardly inclined discharge conduct 26 which leads to a conventional hot pit storage area 27. The point of communication of the discharge conduit 26 with the rising conduit or stand pipe 24 is indicated at 28 and it will be observed that this is placed below the level of the top plate 20' of the calcining kettle 10. In fact, it is desirable that the point 28 be approximately 18 inches below the top of the kettle; which is approximately the plane of the surface of the initial charge of substance to be calcined within the kettle when the latter has been filled to its maximum operating height.

In operation, the kettle is slowly filled while being heated, via the inlet 21 with raw gypsum rock to a level approximately indicated by the reference character 29. Once the contents of the kettle have been calcined and have reached a desirable temperature as stated, a continuous feed of raw gypsum rock is caused to pass through the inlet 21 from the mineral bin into the top of kettle 10. The calcined gypsum rock has fluidized properties including flow characteristics similar to semi-fluids. Consequently as soon as additional raw material is fed by the inlet, to the kettle, the calcined product overflows the stand pipe 24 and flows down the discharge pipe 26 to the hot pit 27 in a quantity equal to the amount of raw material passing in the inlet.

By adjusting the rate of feed, it will be appreciated that only calcined gypsum passes through the stand pipe 24 to the discharge pipe 26 thus making a continuous process which eliminates the time wasting filling and dumping of the calcining kettles.

Figure 2:
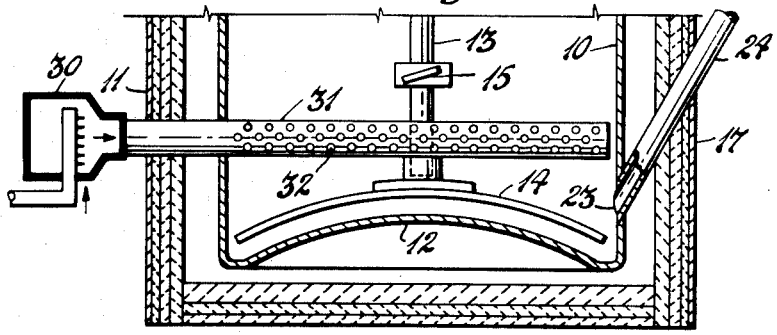
FIGURE 2 represents a partial vertical section of a plaster kettle constructed in accordance with the second form of my invention.

In the second embodiment shown in FIGURE 2, the source of heat takes the form of a gas or other suitable fuel burner 30 situated adjacent the base of the kettle 10. A discharge tube or pipe 31 extends from the burner 30, through the wall 11 of the kettle and spans the base of the kettle as illustrated. This pipe or tube is perforated as at 32 to permit the hot gases of combustion to discharge into the interior of the kettle and through the gypsum therein thus not only calcining the gypgum but also assisting in the fluidization thereof. As mentioned previously, the pressure of the discharged gases through pipe 31 should be greater than the pressure exerted by the gypsum surrounding same.

As an example of the operation of the first form of my invention, ground raw gypsum 90% of which would pass a 100 mesh screen and having a calcium sulphate content of approximately 86% the balance consisting mostly of limestone was continuously calcined at 300° F. at a rate of 10.5 tons per hour. The resulting plaster had the following approximate analysis:

| | Percent |
|---|---|
| Hemihydrate | 77.2 |
| Soluble anhydrite | 3.3 |
| Dihydrate | 3.6 |

The same material calcined at 330° F. had the following approximate analysis:

| | Percent |
|---|---|
| Hemihydrate | 67.0 |
| Soluble anhydrite | 13.1 |
| Dihydrate | 3.5 |

It has further been found that the operation of the kettle and in particular the free passage of the hemihydrate material up the discharge conduit or stand pipe is greatly enhanced when the temperature of the conduit or stand pipe is maintained at a temperature above the equilibrium temperature of hemihydrate (which is substantially above that of gypsum) so that the evolution of steam continues during passage of the hemihydrate up the conduit or stand pipe. Where the stand pipe extends within the flue of the kettle (as in the accompanying FIGURE 1) this result is automatically achieved. Where a discharge conduit is not in contact with, or is insulated from, the hot gases of the combustion chamber, it may be found desirable to insert a small heater, for example an electrical heating element, near the bottom of the pipe. Alternatively the fluidisation of the hemihydrate material in the discharge conduit can be improved by the introduction of compressed air downwardly through a pipe 33' terminating at 34 adjacent the base of discharge conduit 24' thereof as shown in FIGURE 4. In this connection what happens is that the introduced air by lowering the relative humidity in the stand-pipe, causes evolution of steam from the hemihydrate moving up the pipe. It is this steam which constitutes the fluidising medium.

Reference to FIGURE 3 shows the structure incorporating a stand-pipe or rising conduit 24' within the kettle 10 together with screw conveyor means 25 situated transversely between the downwardly and outwardly inclined stand pipe 26' and a discharge pipe 27' leading to the hot pit 27.

In this embodiment the stand pipe 24' is substantially vertical and situated within the kettle 10, the lower end 29 communicating with the interior of the kettle adjacent the agitator blade 14.

The discharge pipe 26', which is located in a similar position with relation to the top of the kettle to the discharge pipe 26 in FIGURE 1, communicates with a transverse delivery pipe 30', containing the aforesaid screw-conveyor means 25', which, with the pipe 30 extend through the wall of the kettle.

Situated within the stand pipe 24' (as already noted) is a heating element 32 connected to a source of electrical energy shown schematically at 33. This heating element, which need only be relatively small and in the neighborhood of 800 watts, maintains the continuous flow desirable in this process.

Since various modifications can be made to the invention herein described within the scope of the inventive concept disclosed, it is not intended that protection of the said invention should be interpreted as restricted to the modification or modifications or know parts of such concept as particularly described, defined or exemplified, since this disclosure is intended to explain the construction and operation of such concept and is not for the purpose of limiting protection to any specific embodiment or details thereof.

What I claim as my invention is:

1. The process of calcining a mass of fluidisable and powdered calcium substance which comprises initially charging a calcining kettle with said substance, heating same to the required calcining and fluidising temperature while in said kettle, maintaining said temperature within limits and then, when said substance is completely calcined, adding a substantially continuous stream of said powdered substance to the upper strata of said mass, and causing said calcined substance to pass substantially continuously from the bottom of the kettle as and to the extent that the said added substance becomes fluidised and calcined by heat transfer thereto from said initial charge, by upward displacement due to the head of material in the kettle.

2. The process according to claim 1 in which said substance is powdered gypsum rock, and in which the said temperature is between 280° and 340° F.

3. The process according to claim 1 wherein the said upward displacement of substance from the bottom of the kettle takes place in the form of a substantially continuous, relatively slender column separated from the contents of said kettle, to a height approximately equal to the upper surface of substance in said kettle.

4. The process according to claim 3 wherein said separated column is within said kettle.

5. Apparatus for continuously calcining a downwardly moving mass of powdered calcium substance capable of being fluidised by the application of heat thereto comprising in combination a calcining kettle, means for heating said substance to a fluidised state, said kettle having an inlet means for said powdered calcium substance in the vicinity of the upper end thereof, and a rising conduit having an intake opening in the vicinity of its lower end communicating with the bottom interior of said kettle, and a discharge opening adapted to be in approximately the horizontal plane occupied by the upper surface of a said body of powdered calcium substance within said kettle when it is filled to a pre-determined operating level.

6. Apparatus according to claim 5 in which said conduit inclines outwardly and upwardly from said kettle.

7. Apparatus according to claim 5 in which said conduit is situated within said kettle, and which includes outwardly extending discharge means connected to said conduit at least near its upper end, said discharge means projecting through the wall of said kettle.

8. Apparatus according to claim 5 which includes separate heating means in said rising conduit.

9. Apparatus according to claim 5 which includes means for delivering compressed air into the lower part of said rising conduit to assist in the fluidisation of substance therein.

10. The process according to claim 3 in which said column of substance is subjected to auxiliary heat other than that which heats said substance, prior to its upward passage in the form of said column.

11. The process according to claim 3 in which compressed air is introduced into said column of substance.

12. The process according to claim 1 in which said substance is mechanically agitated.

13. The process according to claim 3 in which said substance is mechanically agitated.

14. The process of calcining a mass of a fluidisable and powdered calcium substance which comprises charging a calcining kettle with said substance, heating same to the required calcining and fluidising temperature, maintaining said temperature within limits, and then, when said substance is completely calcined, adding a continuous stream of said powdered substance to the upper stratum of said mass, and causing said calcined substance to pass continuously from the bottom of the kettle by upward displacement due to, and in a volume substantially equal to, that of said continuous stream, preparatory to discharge from said process.

15. The process according to claim 14 in which the said substance is powdered gypsum rock, and in which said temperature is between 280° F. and 340° F.

16. The process according to claim 14 wherein the said upward displacement of substance from the bottom of the kettle takes place in the form of a substantially continuous, relatively slender column separated from the contents of said kettle., to that of a height approximately equal to the upper surface of substance in said kettle.

17. The process of calcining a mass of fluidisable and powdered calcium substance which comprises charging a calcining kettle with said substance, heating same to the required calcining and fluidising temperature, maintaining said temperature within limits, applying mechanical agitation to at least the substance at the bottom of said kettle, and then, when said substance is completely calcined, adding a continuous stream of said powdered substance to the upper stratum of said mass, and causing said calcined substance to pass continuously from the bottom of said kettle.

18. The process according to claim 17 in which said substance is powdered gypsum rock and in which the said temperature is between 280° F .and 340° F.

19. The process according to claim 17 wherein the said upward displacement of substance from the bottom of the kettle takes place in the form of a substantially continuous, relatively slender column outside the confines of said kettle, to a height approximately equal to the upper surface of substance in said kettle.

20. In a process for the continuous calcining of powdered and fluidisable calcium substance, the step which comprises introducing a heated gas into the vicinity of the bottom of a mass of said substance which is moving downwardly within a containing kettle, such gas being under pressure greater than that of said substance upon the discharge points of said gas into said kettle.

21. The process according to claim 20 in which said substance is powdered gypsum rock and in which the said temperature is between 280° F. and 340° F.

22. Apparatus for substantially continuously admitting, calcining and discharging a substantially continuously downwardly moving, predominantly unobstructed mass of a fluidisable and powdered calcium substance, comprising in combination, a calcining kettle for containing said mass said kettle having an admitting aperture in the upper part thereof, means for heating and fluidising said mass while in said kettle, mechanical means in the base portion of said kettle for continuously agitating said mass, and means connected to said kettle at the base portion thereof, including a free and unobstructed aperture for conducting said substance while remaining in a fluidised state, clear away from said apparatus.

23. Apparatus for calcining a continuously downwardly moving, predominantly unobstructed mass of a fluidisable and powdered calcium substance, and for conveying the same therefrom, comprising a kettle, means for heating the interior thereof and fluidising the mass therein, said kettle having intake means adapted for receiving a substance to be calcined, in the upper most stratum of said mass, a conduit, the lower end of which communicates with the interior base portion of said kettle, said conduit being adapted for extending upwardly to at least the horizontal plane of said uppermost stratum, said conduit being apertured for discharge of said substance on approximately such plane, the volume of said kettle permitting said substance, when fluidised, to rise in said conduit to be discharged therefrom by upward displacement responsive to increments to the upper stratum of said mass in said kettle.

24. The apparatus according to claim 23 in which said kettle has a surrounding wall which is provided with a discharge aperture in the vicinity of the base thereof, the lower end of said conduit being connected to said aperture, said conduit extending upwardly externally of said wall.

25. The apparatus according to claim 23 in which said conduit is adapted so that it extends upwardly within said kettle at least to the height of said upper most stratum of the downwardly moving mass in said kettle, and which includes discharge means connected to said conduit at a location adapted to be on approximately the plane of said stratum, extending through the wall of said kettle.

26. The process of calcining a mass of finely ground gypsum rock which comprises charging a calcining kettle with said gypsum rock, heating said gypsum rock while in said kettle to the required calcining temperature whereby to fluidize the same and maintaining said temperature within calcining limits, applying mechanical agitation to said gypsum in said kettle, and then when said gypsum is calcined, adding a continuous stream of said gypsum rock to an upper stratum of said agitated mass of calcined gypsum and causing said calcined gypsum to pass continuously from a lower stratum of said mass through a conduit maintained at calcining conditions, and discharging the calcined gypsum from said conduit.

27. The process of calcining a mass of finely ground gypsum rock which comprises charging a calcining kettle with said gypsum rock, heating said gypsum rock to the required calcining temperature within said kettle whereby to fluidize the same and maintaining said temperature within calcining limits, applying mechanical agitation to said gypsum in said kettle, and then when said gypsum is calcined, adding a continuous stream of said gypsum rock to an upper stratum of said agitated mass of calcined gypsum and causing said calcined gypsum to pass continuously from the lower stratum of said mass through a conduit maintained at said calcining conditions, and discharging the calcined gypsum from said conduit, the addition of gypsum rock and discharge of calcined gypsum being coordinated to maintain a relatively constant mass of agitated, fluidized, calcined gypsum in said kettle.

28. The process of calcining a mass of finely ground gypsum rock which comprises charging a calcining kettle with said gypsum rock, heating said gypsum rock to the required calcining temperature within said kettle whereby to fluidize the same and maintaining said temperature within calcining limits, applying mechanical agitation to said gypsum in said kettle, and then when said gypsum is calcined, adding a continuous stream of said gypsum rock to an upper stratum of said agitated mass of calcined gypsum and causing said calcined gypsum to pass continuously from the lower stratum of said mass, through a conduit maintained at said calcining conditions, and discharging the calcined gypsum from said conduit, the addition of gypsum rock and discharge of calcined gypsum and heat input being coordinated to maintain a relatively constant mass of agitated, fluidized, calcined gypsum at a relatively constant temperature in said calcining kettle.

29. The apparatus according to claim 5 which includes a heat retaining jacket spaced from said kettle around at least a portion of the lower part of said kettle, said rising conduit extending externally of said kettle and upwardly through the space enclosed by said heat jacket.

30. The apparatus according to claim 29 which includes means for mechanically agitating said substance while in said kettle.

31. The process of calcining a mass of fluidisable and powdered gypsum rock which comprises initially charging a calcining kettle therewith, heating same to the required calcining and fluidising temperature while in said kettle, maintaining said temperature within limits, and then, when said gypsum rock is calcined to the hemihydrate form, adding a substantially continuous stream of said gypsum rock to the upper stratum of said mass, and causing said gypsum rock in hemihydrate form to pass substantially continuously from the bottom of the kettle as and to the extent that the said added gypsum rock becomes fluidised and calcined to the hemihydrate form by heat transfer thereto from said initial charge, by upward displacement due to the head of material in the kettle.

32. The process according to claim 31 in which said temperature is between 280° F. and 340° F.

33. An apparatus according to claim 5 wherein the heating means comprises a source of hot combustion gases, and a perforated tube within said kettle adjacent to the base thereof and connected with said gas source, said perforated tube being adapted to discharge the gases of combustion into the interior of the kettle and through the said powdered calcium substance contained therein.

References Cited by the Examiner
UNITED STATES PATENTS

| | | | |
|---|---|---|---|
| 1,798,857 | 3/1931 | Tyler | 23—122 |
| 1,905,089 | 4/1933 | Gough | 263—26 |
| 2,485,317 | 10/1949 | Roetheli | 263—53 |
| 2,821,375 | 1/1958 | Andrews | 263—26 |
| 3,023,175 | 2/1962 | Rodman | 259—8 |

WILLIAM F. O'DEA, *Primary Examiner.*

JOHN J. CAMBY, CHARLES SUKALO, *Examiners.*